Patented Oct. 23, 1951

2,572,561

UNITED STATES PATENT OFFICE 2,572,561

COPOLYMERS OF ACRYLONITRILE AND QUATERNARY AMMONIUM SALTS CONTAINING POLYMERIZABLE ALLYL OR METHALLYL SUBSTITUENTS

George E. Ham, Dayton, Ohio, assignor to Monsanto Chemical Company, St. Louis, Mo., a corporation of Delaware No Drawing. Application October 25, 1949, Serial No. 123,525

8 Claims. (Cl. 260—85.5)

This invention relates to new fiber forming compounds. More particularly the invention relates to copolymers of acrylonitrile and quaternary ammonium salts containing polymerizable allyl or methallyl substituents.

In copending application Serial No. 123,093 filed October 22, 1949, there are described and claimed methods of making dyeable copolymers by polymerizing acrylonitrile with allyl or methallyl esters of halogen substituted carboxylic acids, and thereafter reacting the copolymers with amine or ammonia to form substituted ammonium groups. In accordance with this method described in the said patent application the polymers of acrylonitrile and the allyl or methallyl esters may be treated in solid granular form as produced by the polymerization procedure. Alternatively, the polymer may be treated in solution in a suitable solvent for the fiber forming acrylonitrile polymers, for example N,N-dimethylformamide, N,N - dimethylmethoxyacetamide, butyrolactone and α-cyanoacetamide. By an additional alternative procedure the copolymers of acrylonitrile and the allyl esters may be dissolved in a conventional solvent for the copolymer, extruded by the conventional fiber forming methods, and thereafter reacted with an amine or ammonia to form a dyeable fiber. By all of these procedures described in the pending application, one hundred percent reactivity of the amine or ammonia with the halogen containing ester is not possible. When a solid polymer is being treated in granular or fiber form, the reaction is probably only a surface effect, and where the copolymer is treated in dilute solution it is difficult to attain a substantially complete reaction. Accordingly, the prior art procedure usually requires a copolymer of higher chlorine content in order to enable the substitution of sufficient substituted ammonium groups in the polymer to develop adequate dye receptivity.

The primary purpose of this invention is to provide a means of forming copolymers with all or substantially all of the halogen in the form of quaternary ammonium salt radicals. A further purpose of the invention is to provide by a direct polymerization procedure, dyeable acrylonitrile copolymers. A still further purpose of this invention is to prepare improved general purpose fibers derived from the inexpensive and abundantly available allyl alcohol.

In copending application Serial No. 123,524 filed concurrently herewith by Eugene L. Ringwald and George E. Ham, there are described and claimed new olefinic monomers containing quaternary ammonium groups. These new compounds are prepared by reacting allyl or methallyl esters of halogen substituted acetic acids with tertiary amines, and are the (carbovinyloxyalkyl) trialkylammonium halides.

In accordance with the present invention it has been found that the new allyl and methallyl esters containing quaternary ammonium salt substituents may be polymerized with acrylonitrile. By this procedure fiber forming copolymers are formed, which copolymers are capable of being dyed without subsequent treatment of copolymer or fiber. The new copolymers are those of 85 to 99.5 percent of acrylonitrile and from 0.5 to 15 percent of the allyl or methallyl esters containing quaternary ammonium substituents. Preferred compositions of optimum value in the fabrication of synthetic fibers are the copolymers of 90 to 99 per cent acrylonitrile and from one to ten percent of the allyl or methallyl esters.

Suitable allyl and methallyl esters for the practice of this invention are those represented by the following structural formula:

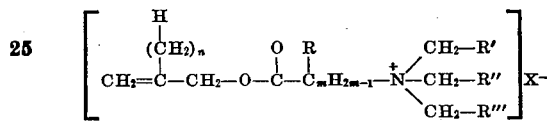

wherein $n$ is a small whole number from zero to one, inclusive, $m$ is a small whole number from one to two, inclusive, R', R" and R''' are radicals of the group consisting of alkyl radicals having up to four carbon atoms, hydroxy alkyl radicals having up to four carbon atoms and hydrogen, R is a radical of the group consisting of hydrogen and alkyl radicals having up to six carbon atoms, and X is a halogen of the group consisting of chlorine, bromine or iodine.

The allyl and methallyl esters of the quaternary amine salt acids may be prepared by a variety of methods. In copending application Serial No. 123,524, filed October 25, 1949 by Eugene L. Ringwald and George E. Ham, some of these compounds and a method for their production by the reaction of allyl or methallyl α-haloacetate with tertiary amines, such as trimethylamine and triethylamine, are described and claimed.

An alternative method for preparing the allyl and methallyl esters of the quaternary ammonium substituted acetates involves the reaction of a secondary amine with a derivative of an α-haloacetic acid, which product upon neutralization is converted into a tertiary amino substituted derivative of the acid. The tertiary amine may be converted to a quaternary ammonium salt by reaction with an alkyl halide. These haloacetic acid derivatives may be converted to allyl or methallyl esters by conventional esterification procedures prior to the reaction with the secondary amine, or in the form of the intermediate tertiary amine, or as the quaternary ammonium salt. This method is particularly useful for the preparation of derivatives where the various alkyl substituents are different. Thus, allyl chloroacetate may be reacted with methylethylamine and, after neutralization to form the tertiary amine, may be reacted with butyl bromide to form (carboallyloxymethyl) butylethylmethylammonium bromide.

The allyl and methallyl esters of the quaternary ammonium substituted carboxylic acids may also be prepared from unsaturated carboxylic acid derivatives, such as acrylates or crotonates, by reaction with secondary amines and thereafter with alkyl halides. This method is particularly useful in the preparation of compounds having the quaternary ammonium radical substituted in the $\beta$-position. The allyl esters are prepared by the conventional esterification or ester interchange with allyl or methallyl alcohol and the tertiary amino acid or the corresponding quaternary ammonium derivatives.

The new copolymers are prepared by polymerization in an aqueous medium in the presence of a suitable free radical catalyst, and if desired in the presence of a dispersing agent. The polymerization usually involves heating a mixture of the monomers, water and catalyst in such a manner as to promote a controlled reaction of the monomers and the formation of a copolymer of uniform physical and chemical properties.

The manner in which the monomers are added to the reactor will depend upon the physical characteristics of the monomers. Many of the quaternary amine salts are soluble in the acrylonitrile in the proportions desired in the ultimate copolymer. Under such conditions the monomers may be mixed and added gradually to an aqueous medium containing the other essential reactants. If the quaternary amine salt is not soluble in the acrylonitrile in the proportions desired in the ultimate copolymer it will usually be soluble in water. Under the latter conditions the acrylonitrile and an aqueous solution of the quaternary amine salt are added separately by means of continuous streams, providing a mixture of monomer within the reactor in the proportion desired in the copolymer.

The polymerization reaction may be catalyzed by means of any free radical catalyst. Suitable catalysts include the water soluble peroxy compounds, for example hydrogen peroxide, sodium peroxide, salts of the various peroxy acids, such as potassium persulfate, sodium perborate, sodium persulfate and other alkali metal salts of peroxy acids, or other water soluble peroxy compounds. Azo catalysts, such as azo-2,2'-diisobutyronitrile may be used advantageously in this copolymerization. A wide variation in concentration of catalysts may be used depending upon the temperature at which the reaction is to be conducted, the concentration of the monomers in the reaction mass, and the molecular weight desired in the ultimate product. From 0.01 to five percent by weight of monomer may be used. In general it is desirable to have a uniform reaction rate and therefore a substantially uniform concentration of the catalyst is desired throughout the reaction. The latter condition may be achieved by adding an aqueous solution of the catalyst continuously throughout the reaction. An approximation of these conditions may be obtained by separately preparing the aqueous solution and adding the solution in increments periodically throughout the reaction.

It is desirable to conduct the polymerization under conditions regulated so that the particles of copolymer formed are finely divided particles which are readily separated from the aqueous medium by filtration. The desired product may be achieved by careful selection of the dispersing agent. Although a wide variety of dispersing agents are known and available for use, it has been found that desirable results are achieved through the use of the alkali metal salts of formaldehyde condensed aromatic sulfonic acids. Desirable results can be achieved through the use of 0.05 to 0.50 percent based on the weight of the monomer charged, but optimum performances have been obtained with concentrations between 0.08 and 0.15 weight percent. The dispersing agent may be charged into the polymerization reactor at the beginning of the reaction, or it may be added continuously, or periodically, throughout the course of the reaction.

The polymerization method may also be practiced by the use of molecular weight regulators, which act as chain terminators and prevent the formation of very large molecular weight increments. Such compositions are the high molecular weight aliphatic mercaptans, carbon tetrachloride, and dithioglycidol.

The polymerizations are preferably initiated by charging the aqueous medium containing the dispersing agent and a portion of the catalyst and heating the mixture to the approximate temperature of polymerization, for example 65 to 90° C. A mixture of the monomers or separate streams of the two monomers are then gradually introduced and the reaction allowed to proceed. The monomers are added at approximately the rate of polymerization so as to maintain within the reactor the desired uniform concentration of each monomer. After all the monomer has been added it is sometimes desirable to continue the reaction for a short period of time to assure a substantially complete polymerization. The reaction mixture is then steam distilled to remove traces of unreacted monomers and the polymers then separated from the aqueous medium by any conventional method. Under ideal conditions a solid may be readily filtered from the aqueous medium.

Polymerizations are preferably conducted in glass or glass-lined steel vessels, which are provided with an efficient means for agitation. Generally rotary stirring devices are not desirable but any means for agitating the contents of the vessel to insure intimate contact of the reagents may be employed. In general the polymerization procedure may be conducted by methods and equipment well known to the art.

The new copolymers of acrylonitrile and (carboallyloxymethyl) trialkylammonium chloride are quite different in their behavior from the corresponding vinyl esters. The allyl ester salt copolymers are less reactive in polymerization, and a smaller proportion of the allyl ester salt enters the copolymer, but the smaller proportion induces a greater degree of dye-receptivity than the larger proportion of the vinyl salt ester which enters the copolymer from an equivalent charge in a preparation of a copolymer of acrylonitrile and a (carbovinyloxymethyl) trialkylammonium chloride. Thus unusually desirable dye affinity can be obtained without the use of comonomers in proportions which depreciate fiber properties.

Further details of the practice of the invention are set forth with respect to the following examples.

*Example 1*

A two-liter, 3-necked, round-bottom flask provided with a rotary stirring mechanism, a dropping funnel and a reflux condenser was charged with 800 grams of distilled water, 170 grams of acrylonitrile and 30 grams of (carboallyloxymethyl)trimethylammonium chloride, two grams of azo-2,2'-diisobutyronitrile and 0.2 grams of t-dodecylmercaptan. The flask and its contents were heated to 75° C. and refluxed for two hours. The granular copolymer so produced was filtered, washed with water and dried. Fibers spun from a solution of N,N-dimethylacetamide were found to have a tensile strength of 2.66 grams per denier, a boil shrinkage of 13.3, and an elongation of six to seven percent. One gram of fiber was found to exhaust a dye bath containing one ml. of two percent Wool Fast Scarlet G Supra dye, 5 ccs. of three percent sulfuric acid and 40 mls. of water, in one-half hour at 100° C.

*Example 2*

The apparatus used in the preceding example was charged with 800 grams of distilled water, 184 grams of acrylonitrile, 16 grams of (carboallyloxymethyl)trimethylammonium chloride, two grams of potassium persulfate and 0.4 gram of t-dodecylmercaptan. The mixture was heated for two hours at 80° C. and then rapidly steam distilled to remove unreacted monomers. A 74 percent yield of polymer was obtained. A chlorine analysis indicated that the percentage of amine salt in the copolymer was substantially less than the eight percent charged to the reactor. The fiber produced from the copolymer was exceptionally dye receptive and one gram exhausted the standard dye bath, described in the preceding experiment, in one-half hour at 100° C.

*Example 3*

A two-liter, 3-necked, round bottom flask was charged with 740 grams of water and two grams of a formaldehyde condensed naphthalene sulfonate. A separate vessel was charged with a solution of 184 grams of acrylonitrile and 16 grams of (carboallyloxymethyl)triethylammonium chloride. The mixed monomers were added to the aqueous medium at reflux temperature for over a period of one and one-half hours. A separately prepared catalyst solution of two grams of potassium persulfate in 60 mls. of water was added in six increments, one at the start and the remaining five at equally spaced intervals throughout the reaction. An 80 percent yield of a polymer was prepared. Fibers prepared from the polymers were unusually dye receptive.

The invention is defined by the following claims.

1. A copolymer of 85 to 99.5 percent by weight of acrylonitrile and from 0.5 to 15 percent of a compound having the structural formula:

$$\left[ \begin{array}{c} \text{H} \\ (\text{CH}_2)_n \\ \text{CH}_2=\overset{|}{\text{C}}-\text{CH}_2-\text{O}-\overset{\text{O}}{\underset{\|}{\text{C}}}-\overset{\text{R}}{\underset{|}{\text{C}_m\text{H}_{2m-1}}}-\overset{+}{\text{N}} \diagdown \begin{array}{c} \text{CH}-\text{R}' \\ \text{CH}_2-\text{R}'' \\ \text{CH}-\text{R}''' \end{array} \right] \text{X}^-$$

wherein $n$ is a small whole number from zero to one, inclusive. $m$ is a small whole number from one to two inclusive. $R'$, $R''$ and $R'''$ are radicals of the group consisting of alkyl radicals having up to four carbon atoms, and hydrogen, R is a radical of the group consisting of hydrogen and alkyl radicals having up to six carbon atoms and X is a halogen of the group consisting of chlorine, bromine and iodine.

2. A copolymer of 90 to 99 percent by weight of acrylonitrile and from one to ten percent of (carboallyloxymethyl)trialkylammonium chloride, wherein the alkyl radicals have up to two carbon atoms.

3. A copolymer of 90 to 99 percent by weight acrylonitrile and from one to ten percent of (carboallyloxymethyl)triethylammonium chloride.

4. A copolymer of 90 to 99 percent by weight acrylonitrile and from one to ten percent of (carboallyloxymethyl)trimethylammonium chloride.

5. A method of preparing a dyeable copolymer, which comprises heating from 85 to 99.5 percent by weight of acrylonitrile with from 0.5 to 15 percent of a compound having the structural formula:

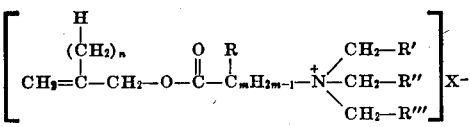

wherein $n$ is a small whole number from zero to one, inclusive, $m$ is a small whole number from one to two, inclusive, $R'$, $R''$ and $R'''$ are radicals of the group consisting of alkyl radicals having up to four carbon atoms, hydroxy alkyl radicals having up to four carbon atoms, and hydrogen, R is a radical of the group consisting of hydrogen and alkyl radicals having up to six carbon atoms, and X is a halogen of the group consisting of chlorine, bromine, and iodine in an aqueous medium, in the presence of a free radical catalyst, and separating the resulting copolymer.

6. A method of preparing a dyeable copolymer, which comprises heating from 90 to 99 percent by weight of acrylonitrile and from one to 10 percent of a (carboallyloxymethyl)trialkylammonium chloride, wherein each alkyl group has up to two carbon atoms, in an aqueous medium in the presence of a free radical catalyst, and separating the resulting copolymer.

7. A method of preparing a dyeable copolymer, which comprises heating from 90 to 99 percent by weight of acrylonitrile and from one to 10 percent of (carboallyloxymethyl)trimethylammonium chloride, in an aqueous medium in the presence of a free radical catalyst, and separating the resulting copolymer.

8. A method of preparing a dyeable copolymer, which comprises heating from 90 to 99 percent by weight of acrylonitrile and from one to 10 percent of (carboallyloxymethyl)triethylammonium chloride, in an aqueous medium in the presence of a free radical catalyst, and separating the resulting copolymer.

GEORGE E. HAM.

REFERENCES CITED

The following references are of record in the file of this patent:

UNITED STATES PATENTS

| Number | Name | Date |
| --- | --- | --- |
| 2,138,763 | Graves | Nov. 29, 1938 |